Jan. 8, 1929.  1,698,205
J. H. TELLER
AUTOMATICALLY OPERATING WATER SEALED SYSTEM AND
APPARATUS FOR STEAM COOKING UTENSILS
Filed Jan. 21, 1928
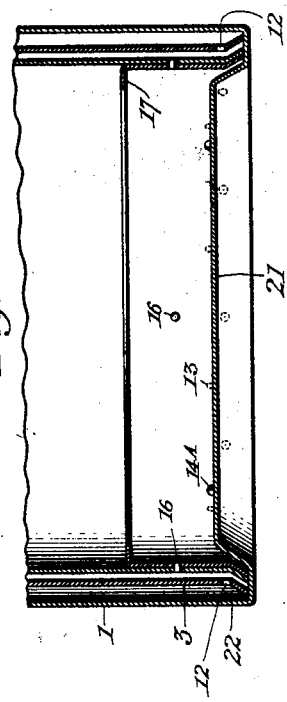
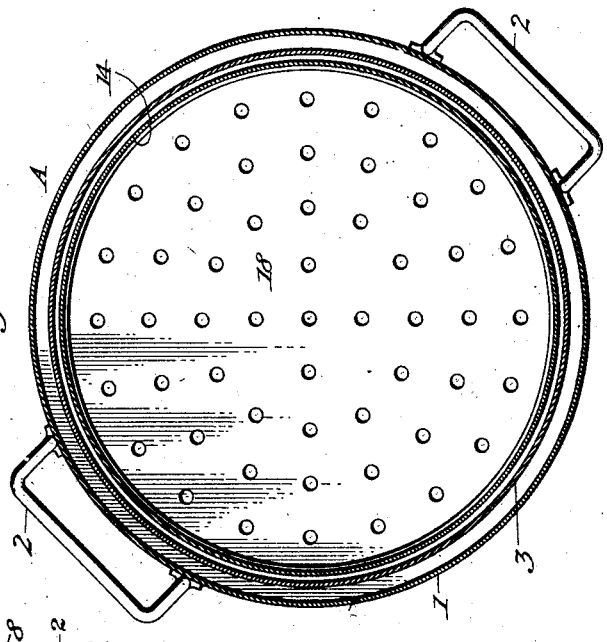
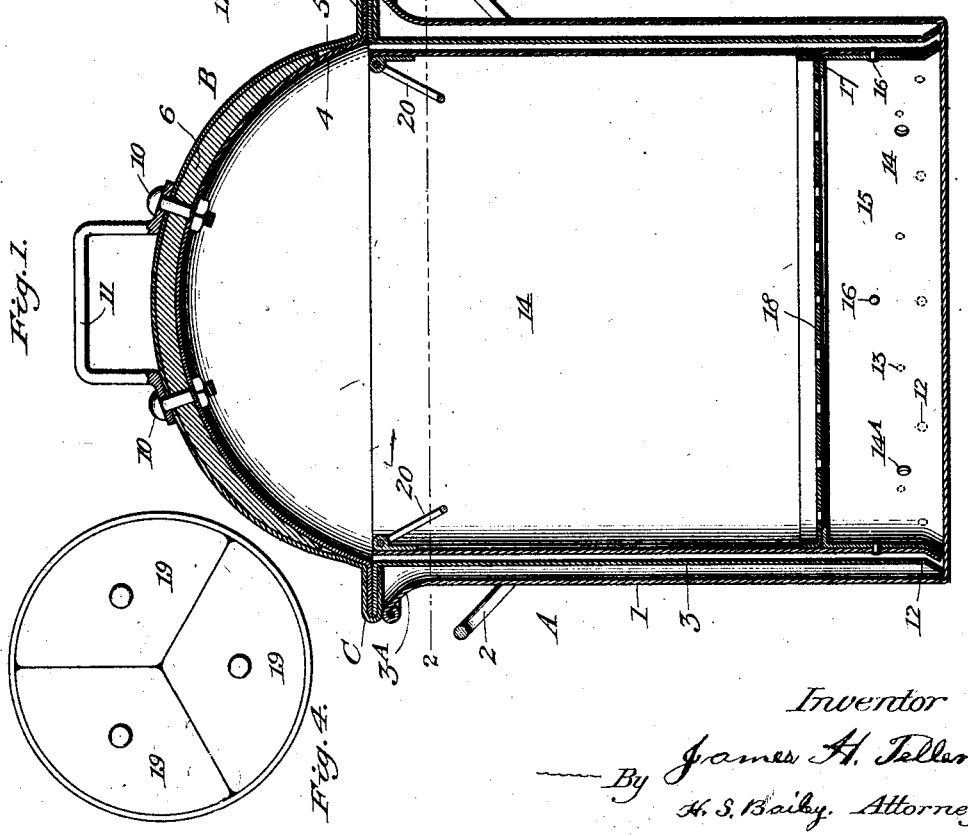
Inventor
James H. Teller
By H. S. Bailey, Attorney.

Patented Jan. 8, 1929.

1,698,205

UNITED STATES PATENT OFFICE.

JAMES H. TELLER, OF DENVER, COLORADO.

AUTOMATICALLY-OPERATING WATER-SEALED SYSTEM AND APPARATUS FOR STEAM-COOKING UTENSILS.

Application filed January 21, 1928. Serial No. 248,390.

My invention relates to an automatically operating water sealed system and apparatus for steam cooking utensils.

And the objects of my invention are:

First, to provide an automatically operating water seal forming and maintaining system and apparatus that completely surrounds and cooks food by steam heat.

Second, to provide a steam heat food cooking utensil in which the pressure is automatically controlled by a movable weighted hood member arranged to hold the steam at a normal pressure, by means of a water seal above which it is raised by an excess pressure of steam to a position that breaks the water seal and allows the excess steam to escape.

Third, to provide a water sealed steam cooking utensil, that is simple in construction and that is provided with straight telescoping parts that are easily cleaned and kept in perfect sanitary condition, and the parts of which can be made in large quantities by the tools and machinery in common use; and consequently it can be made and sold cheaper than many of the food cookers on the market; and to provide a steam cooker, the parts of which are so straight and openly constructed that food can be placed in it and taken from it in a few seconds of time, and it will cook in a few minutes all kinds of vegetables, cereals and meats and other foods, and that will confine the odor of cooking food inside of the conical dome, and by excluding the air, decrease the loss of vitamines by cooking.

I attain these objects by the mechanism illustrated in the accompanying drawings, in which:

Figure 1 is a vertical sectional view of the improved cooking utensil.

Figure 2 is a sectional plan view thereof on the line 2—2 of Fig. 1.

Figure 3 is a vertical sectional view of the bottom portion of the cooker, showing a modification in the construction of the bottom thereof.

Figure 4 is a plan view of a food holding vessel having three compartments.

Referring to the drawings:

The letter A illustrates a steam cooking utensil embodying my system and apparatus, and in this and the other views of the drawings the numeral 1 designates the outside water container or vessel in the bottom of which about two inches of water is placed and maintained, and on opposite sides of the upper portion of the vessel 1 are secured handles 2, by which it can be lifted and carried. The rim portion of the vessel 1 is slightly flared, as shown at 3A. Within this container I place a vertically movable steam confining and condensing cylinder 3, which practically fills but fits loosely and slidably within the water container and rests with its straight horizontal slightly flared edge on the floor of the container except when the steam pressure is against the inside of its dome-shaped top, sufficient to raise it up from the floor, which it is continuously doing as whenever the lifting power of the steam pressure exceeds the weight of the conical dome when it is made of aluminum or tin, it is raised up from the floor in the water and in order that the steam will not raise it too high; I provide it with means for allowing the steam to escape, as will presently be shown.

The steam confining cylinder or cover 3 is provided with a dome like top B made up of two thicknesses of sheet metal 4 and 5, preferably aluminum, and between these sheet metal members is confined a metal weight 6, which is also dome-shaped to conform to the shape of the top, and which is preferably cast iron. The edge of the inner member 4 of the dome terminates in a flange 7 which rests on a corresponding flange 8 which is formed on the upper end of the cover 3, and the outer member 5 of the dome is also formed with a flange 9, which rests on the flange 7, and is bent over and under to bear against the under side of the flange 8, thereby connecting the dome members 4 and 5, and the cylinder 3 together, and the flanges 7, 8 and 9, together form a flange C, which normally rests upon the flared rim 3A of the outer vessel 1.

The weight 6 is secured against movement by bolts 10, which extend through the weight and through the members 4 and 5 of the dome, and these bolts also pass through the bent ends of a V-shaped handle 11, and secure the same to dome, as shown in Fig. 1. The weight 6 is sufficiently heavy to hold the cover down until the desired steam pressure is developed in the cooker, as will hereinafter appear.

My invention contemplates any practical means for allowing the steam to escape before its pressure raises the dome so high in the container as to raise its lower edge out of the water, and allow all of the steam to escape from it around its lower edge into the slight circumference space between its outside peripheral surface and the inside surface of the container, both of which are preferably made of a true circular shape, but can be made square or hexagon in shape if desired; and I preferably carry out the steam pressure regulating features of my invention in the following manner:

Around the circumference of the lower edge of the steam dome 3, I form two rows of holes 12 and 13 through its shell, the lower row of holes 12 is placed preferably within about an eighth of an inch of the extreme lower open end of the dome, and these holes are preferably made about five-thirty-seconds of an inch in diameter, but may be made either larger or smaller, as desired.

The other circumferential row of holes 13 is placed about one-half inch above the lower edge of the dome and consequently about three-eights of an inch above the lower row of holes 12. The steam dome carries such weight under its top as will create the pressure required in ordinary cooking.

The water in the bottom of the container forms a seal that acts to confine the steam within the dome, and consequently when the lifting power of the steam pressure is strong enough to lift the dome in the container from off its bottom, its lower edge rises in the water until the first circumferential holes 13 rise above or nearly to the surface of the water, then enough of the steam escapes through them from the inside of the dome into the space between the dome and the container to the atmosphere to relieve the lifting pressure from its inside under ordinary conditions; but if an exceedingly hot fire is underneath the container, the container would generate a much higher pressure of steam, than the upper small holes will allow to escape. Then the dome is lifted up in the water until its larger row of holes 12 are exposed above the water and the excess pressure of steam escapes through them, consequently the dome is free to rise and fall within the container, by this variation of the lifting power of the steam pressure within it, which is governed by the rows of steam outlet holes in its bottom edge and the cooperating water seal that covers them.

Within the steam confining dome 3 I place an open ended cylindrical member 14 which rests on the bottom of the outer vessel 3 and extends up to the level of the flange 8. In the lower end of the member 14 is secured a flat ring 15 by means of rivets 16 which pass through the ring and through the member 14, and the upper end of the ring terminates in an introverted flange 17, which is adapted to support a food holding pan just above the water level in the cooker.

This food holding receptacle 14 fits within and fills the steam dome loose enough to form a narrow concentric space around it of preferably about an eighth of an inch to allow the steam to pass to the top of the dome. I have shown a perforated tray or pan 18 supported on the flange 17, but I also employ a pan having an imperforated bottom, as will hereinafter appear.

I preferably make this food receiving receptacle 14 long enough to extend up to close to the top of the straight side of the steam dome, consequently it is deep enough to hold a large amount of food, as it is preferably made about seven inches in diameter inside, but it can be made larger or smaller as desired, as well as shorter than the straight side of the steam dome. I use in connection with this food receptacle, a pan having a solid imperforated bottom for receiving food, such as cereals or liquids and foods that have to be enclosed to hold them; and I also use the pan 18, having a perforated or screen bottom, which will enable potatoes, onions, and other foods having jackets or outer coverings to be cooked quicker as the steam can flow upward through the meshes or apertures of the perforated bottom directly onto and around and all over that character of food.

The receptacle 14 is provided near the lower end thereof, with openings 14$^A$, which permit water from the outer vessel 1 to enter the said receptacle 14.

In Fig. 3 is shown a modification in the construction of the water vessel in which the main portion of the bottom of the vessel is raised, as shown at 21, thereby forming an annular channel 22 around the said raised bottom, in which there will be water to cover the holes or vents 12 and 13 in lower end of the cover 3, which will keep the seal in effect after the main body of water has evaporated.

If desired, the single compartment shown in the food cooking receptacle can be divided into two or more compartments as shown in Fig. 4, in order that the odor from one kind of food in one compartment cannot mix with the odor of the food in the other; covers 19 can be placed on the top of each compartment, and the food receptacle is provided with hand grasping lifting handles 20. The operation is as follows:

Clear pure water is poured into the water container until it is about two inches deep; then the food receptacle 14 is placed in the bottom of the water container with the food in it; then the steam dome is placed in the water container over the food holding receptacle and with its lower end resting on the bottom of the water container in which position the apertures 12 and 13 are sealed by the water as they are below the surface of the water and are consequently water sealed against the escape of any steam through them from the inside of the steam dome.

The cooking utensil is then placed on a hot stove or gas jet burner, and the heat there-from boils the water and turns it into steam which, when an imperforated bottom food receptacle is used rises from the water and flows against its bottom and around its edge and up along its side through the space between it and the steam dome into the top of the steam dome and over the top open edge of the food receptacle into it and down against and around the food.

When, however, the food receptacle is provided with a pan, having a perforated bottom, the steam flows directly up into it through the perforations and flows in contact with the bottom as well as the sides and top of the food as well as flowing around the edge and up through the space between the receptacle and the steam dome.

As long as the steam generates and remains at a pressure that will not lift the steam dome high enough to bring its circumferential row of holes 13 above the water; all of the steam that rises within the dome stays there and as fast as it cools and condenses back into water, it runs down the inside surface of the dome into the water in the bottom of the water container.

When, however, the heat imparted to the bottom of the water container, is hot enough to raise the steam to a pressure that will lift the weight of the steam dome in the water high enough to bring its upper rows of holes 13 above the top of the surface of the water, the steam confining water seal is broken and enough of the steam escapes through these holes all around the circumferential of the steam dome into the concentric open space between it and the inner surface of the water container through which it flows upward and into the atmosphere or is condensed by striking the overhanging flange C of the dome, which allows the steam dome to settle down below the top of the water, and this re-establishes the water seal and holds the steam within the steam dome until the steam pressure is again increased enough to raise the steam until the upper row of holes 13 is again above the water enough to allow the steam to escape through them into the atmosphere as above described.

When, however, the steam is raised to a pressure that lifts the lower edge of the steam dome high enough above the bottom of the water container to bring the lower circumferential row of holes 12 above the surface of the water, the steam flows out of the steam dome through the row of small steam outlet holes 13 and also through the row of large holes 12 into the concentric space between the steam dome and the water container and from it into the atmosphere, until the steam dome again settles down and re-establishes the water seal over both rows of holes and thus again confines the steam within the steam dome and in cooking contact with the food in the food receptacle.

Thus in this automatically operating steam sealing and rleasing cooking system, and the outside water container the food holding receptacle and the steam dome apparatus with its two circumferential rows of steam outlet apertures of different sizes, so positioned and preferably arranged in zigzag relation to each other, that the upper row of small steam outlet holes cooperatingly acts with the water to form a steam pressure regulating seal, and with its lower row of large steam escaping holes arranged and positioned to form a safety escape for the abnormal pressure of the steam which might not only overcook the food in the few seconds of time, but might disarrange the steam dome, relative to the food containing receptacle.

Where gas or other easily regulated heat is used in cooking, when once it is found what heat is required to raise the dome with only occasional escape of steam, the heat may be kept at that degree so as to avoid waste of fuel.

My invention provides a very simple arrangement of a combined system and apparatus that makes an easily and quickly handled and a safe and sure control of the steam through the medium of the water seal for confining and regulating normal cooking temperatures within the steam done and also for providing a practical and instantaneous relief from such sudden and destructive pressure within the steam dome as would overcook and partially or wholly spoil the food.

Having described my combined system and apparatus steam controling water seal cooking utensil what I claim as new and desire to secure by Letters Patent, is:—

1. In a combined water seal steam controlled system and apparatus cooking utensil; in combination, a main outside vessel adapted to be provided with water, a food receptacle supported centrally in said outer vessel with its bottom in close hot water and steam receiving relation to said water, a steam dome member fitting slidably down into and resting on the floor of said water container with its lower edge submerged in the shallow water in said water container, and made and arranged to nearly fill, but of enough smaller diameter than the inside diameter of said water container to form a concentric annular space between its outside surface and the inside of said water container for the escape of the steam from the dome to the atmosphere; said steam dome fitting centrally over said food receptacle loosely enough to form a narraw concentrically annular space between its inner surface and the outer surface of said steam dome for the steam to rise between them into the dome portion of said steam dome; said steam dome being provided with two circumferential rows of steam escaping apertures one above the other in alternating relation at a short distance apart in its lower edge portion that normally rests under the surface of the water in said water container when said steam dome is resting on its bottom; said lower row of steam escaping apertures being positioned a short distance from the lower edge of said steam dome, and the upper row of steam escaping holes being positioned at about twice the distance from the edge of the steam dome as the lower row of steam escaping apertures, said upper row of steam escaping apertures being of a size to regulate the steam pressure within said dome to that required to attain the best cooking conditions by allowing the steam to escape through them when it lifts the steam dome until they are above or at the surface of the water into the space betwen the steam dome and the inside of the water container and from it into the atmosphere, and the lower row of steam escaping holes being made enough larger or in a larger number than the upper row to instantly relieve any sudden rise in the steam pressure that would lift the steam dome high enough to bring these lower steam escape holes above the surface of the water in the water container, and thus preventing over cooking of the food in said food holding receptacle.

2. The herein described system and apparatus steam sealed cooking utensil as in claim 1, wherein the food receptacle is provided with a support near the lower end thereof, and a removable bottom on said support.

3. A steam cooking utensil, provided with a water sealing system and apparatus for automatically regulating the normal food cooking pressure of the steam and for preventing abnormal steam pressures from overcooking the food; which consists of the outer container; the food holding receptacle at the center of said water container and the steam dome fitting down over said food receptacle and down into said water container against its bottom and between it and the inside surface of said water container; said steam dome and said food container being mounted within the said water container to stand in concentric relation to each other and each of the three apparatus members made of such a diameter relative to each other as to form a narrow concentric circumferential steam space, between each two of these three members of this steam cooking apparatus; said water container being adapted to be provided with a supply of water to form a water seal; and the lower edge of said steam dome being provided with steam escaping outlets of different diameters arranged to regulate the food cooking steam pressure of the steam in said steam dome and to permit abnormal steam pressure to escape through them when the dome is raised high enough by such abnormal steam pressure to bring them above the surface of said water seal.

4. In a combined steam cooking system and cooperative apparatus food cooking utensil; the combination of a circular outside open top container adapted to be provided with water enough in its bottom to form a steam seal; a circular steam dome of enough smaller diameter to fit within said outside container and positioned therein to form a narrow annular concentric steam escaping space between them, and having its lower end resting on the bottom of said container in that steam sealing water therein; and having its submerged bottom edge provided with steam escaping apertures arranged one above the other in circular rows, the lower row being under water, seals the steam within the dome; the upper row being adapted to allow the steam to escape from the inside of the steam dome through them when the steam pressure is sufficient to raise the steam dome up through the water seal in the bottom of the container until they are above the surface of the water and the lower holes being adapted to allow any excess pressure of steam within the dome that would raise them above the water seal.

5. In a cooking utensil, a water vessel, a cylindrical steam confining member within the vessel having an open lower end which rests upon the bottom of the vessel, a flange which normally rests upon the rim of the vessel and a weighted dome-shaped top, two horizontal rows of holes being formed in said steam confining member, near the lower end thereof, an open ended member within the steam confining member and resting on the bottom of the water vessel, an introverted flange on the inner face of said open ended member for supporting a food holding receptacle, said steam confining member being lifted by steam pressure when the said pressure is sufficient to overcome the weight of said member, whereby the holes in the lower end of said member rise above the water line in said vessel, thereby permitting the steam to escape.

In testimony whereof, I affix my signature,

JAMES H. TELLER.